United States Patent
Tozuka

(10) Patent No.: US 9,976,043 B2
(45) Date of Patent: May 22, 2018

(54) SOLID WRITING MATERIAL

(71) Applicant: KABUSHIKI KAISHA PILOT CORPORATION, Tokyo-to (JP)

(72) Inventor: Taro Tozuka, Kanagawa-ken (JP)

(73) Assignee: KABUSHIKI KAISHA PILOT CORPORATION, Tokyo-To (JP)

( * ) Notice: Subject to any disclaimer, the term of this patent is extended or adjusted under 35 U.S.C. 154(b) by 77 days.

(21) Appl. No.: 14/787,620

(22) PCT Filed: Apr. 28, 2014

(86) PCT No.: PCT/JP2014/061868
§ 371 (c)(1),
(2) Date: Oct. 28, 2015

(87) PCT Pub. No.: WO2014/178373
PCT Pub. Date: Nov. 6, 2014

(65) Prior Publication Data
US 2016/0075904 A1 Mar. 17, 2016

(30) Foreign Application Priority Data
Apr. 30, 2013 (JP) ................................. 2013-095350

(51) Int. Cl.
| | |
|---|---|
| C09D 11/50 | (2014.01) |
| B43K 19/02 | (2006.01) |
| B43K 19/00 | (2006.01) |
| C09D 125/14 | (2006.01) |
| C09D 13/00 | (2006.01) |
| C09D 133/00 | (2006.01) |
| C08K 5/13 | (2006.01) |
| C08K 5/3462 | (2006.01) |
| C09D 105/00 | (2006.01) |
| C09D 129/04 | (2006.01) |
| C09D 11/17 | (2014.01) |

(52) U.S. Cl.
CPC ............ C09D 125/14 (2013.01); B43K 19/00 (2013.01); C08K 5/13 (2013.01); C08K 5/3462 (2013.01); C09D 11/17 (2013.01); C09D 11/50 (2013.01); C09D 13/00 (2013.01); C09D 105/00 (2013.01); C09D 129/04 (2013.01); C09D 133/00 (2013.01)

(58) Field of Classification Search
CPC ......... C09D 11/50; B43K 19/00; B43K 19/02
See application file for complete search history.

(56) References Cited

U.S. PATENT DOCUMENTS

| | | | |
|---|---|---|---|
| 4,028,118 A | 6/1977 | Nakasuji et al. | |
| 4,425,161 A | 1/1984 | Shibahashi et al. | |
| 4,851,282 A * | 7/1989 | Shimizu | D06M 15/248 428/375 |
| 4,957,949 A * | 9/1990 | Kamada | C08J 3/226 523/201 |
| 5,135,568 A * | 8/1992 | Fasano | C09D 5/00 252/301.16 |
| 5,558,699 A * | 9/1996 | Nakashima | B41M 5/305 106/31.16 |
| 5,919,404 A | 7/1999 | Fujita et al. | |
| 2002/0152929 A1* | 10/2002 | Burgath | A61K 6/0017 106/35 |
| 2003/0122113 A1 | 7/2003 | Senga et al. | |
| 2004/0229754 A1* | 11/2004 | Fujita | B41M 5/305 503/209 |
| 2006/0228498 A1* | 10/2006 | Parr | B44F 5/00 428/29 |
| 2007/0252115 A1* | 11/2007 | Arehart | A41D 19/0082 252/583 |
| 2008/0090726 A1* | 4/2008 | Eskra | B41M 5/385 503/207 |
| 2008/0234160 A1* | 9/2008 | Wenzel | A61K 8/02 510/138 |
| 2009/0209678 A1* | 8/2009 | Sumitomo | B43K 19/02 523/164 |

(Continued)

FOREIGN PATENT DOCUMENTS

| | | |
|---|---|---|
| JP | 49-62230 | 6/1974 |
| JP | 50-81157 | 7/1975 |

(Continued)

OTHER PUBLICATIONS

Machine translation of JP 2009-166310, 2017.*
International Search Report dated Jul. 22, 2014 in International (PCT) Application No. PCT/JP2014/061868.
International Preliminary Report on Patentability dated Nov. 12, 2015 in corresponding (PCT) Application No. PCT/JP2014/061868.
First Office Action dated Jan. 16, 2017 in corresponding Chinese Application No. 201480023843.1, with English Translation.
Extended European Search Report dated Nov. 25, 2016 in corresponding European Application No. 14792005.2.

*Primary Examiner* — Liam J Heincer
(74) *Attorney, Agent, or Firm* — Wenderoth, Lind & Ponack, L.L.P.

(57) ABSTRACT

The invention aims at providing a solid writing material that does not adversely affect the color changing property of script and can obtain sufficient strength. This aim is achieved by the solid writing material that includes: a reversible thermochromic microcapsuled pigment encapsulating a temperature-sensitive color-changeable color-memorizing composition; an excipient; and a resin; the temperature-sensitive color-changeable color-memorizing composition including at least (a) an electron-donating coloring organic compound, (b) an electron accepting compound and (c) a reaction medium effecting reversibly an electron transfer reaction between the (a) and (b) components in a specific temperature range; wherein the excipient or the resin includes a styrene-structure-containing polymer.

6 Claims, 1 Drawing Sheet

(56) References Cited

U.S. PATENT DOCUMENTS

| | | | | |
|---|---|---|---|---|
| 2010/0098475 | A1* | 4/2010 | Fujita | B43K 1/086 401/1 |
| 2010/0120614 | A1* | 5/2010 | Ono | C09K 9/02 503/226 |
| 2010/0234522 | A1* | 9/2010 | Rossi | C09K 11/02 524/550 |
| 2011/0008095 | A1* | 1/2011 | Fujita | C09D 11/17 401/198 |
| 2013/0177345 | A1* | 7/2013 | Kitazawa | B43K 19/02 401/96 |
| 2013/0210622 | A1* | 8/2013 | Ono | C09B 67/0013 503/213 |
| 2014/0004324 | A1* | 1/2014 | Hsieh | C08L 71/123 428/209 |
| 2014/0037362 | A1* | 2/2014 | Kwan | B41M 5/128 401/196 |
| 2014/0291585 | A1* | 10/2014 | Tozuka | B43K 19/18 252/500 |
| 2015/0368487 | A1* | 12/2015 | Lane | G01K 11/18 116/207 |
| 2015/0376433 | A1* | 12/2015 | Tozuka | C09D 13/00 15/427 |
| 2016/0130455 | A1* | 5/2016 | Ono | C09B 11/24 401/196 |

FOREIGN PATENT DOCUMENTS

| | | |
|---|---|---|
| JP | 57-90085 | 6/1982 |
| JP | 7-6248 | 1/1995 |
| JP | 10-310736 | 11/1998 |
| JP | 11-129623 | 5/1999 |
| JP | 11-166149 | 6/1999 |
| JP | 11-268409 | 10/1999 |
| JP | 2001-105732 | 4/2001 |
| JP | 2002-287415 | 10/2002 |
| JP | 2003-253149 | 9/2003 |
| JP | 2004-107546 | 4/2004 |
| JP | 2008-291048 | 12/2008 |
| JP | 2009-166310 | 7/2009 |
| JP | 2011-162729 | 8/2011 |
| JP | 2012-219253 | 11/2012 |
| WO | 2012/046837 | 4/2012 |

* cited by examiner

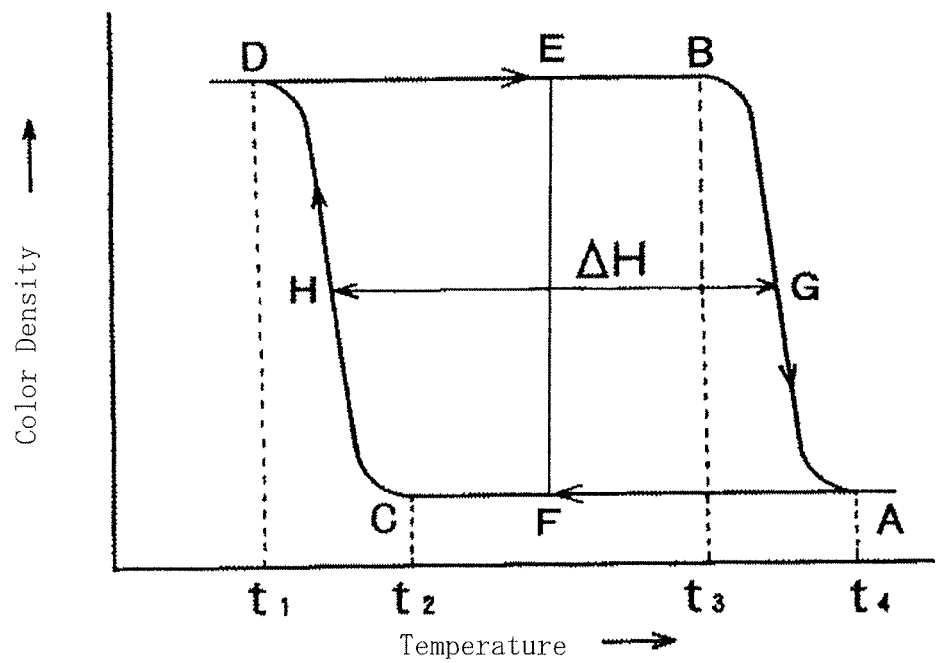

SOLID WRITING MATERIAL

TECHNICAL FIELD

The present invention relates to a solid writing material. More specifically, the present invention relates to a solid writing material which can create script having reversible thermochromism.

BACKGROUND ART

A solid writing material using a reversible thermochromic composition that can memorize enantiotropically the states before and after a color change in a certain temperature range such as normal temperature has been heretofore proposed (for example, Patent Literature 1 to 3).

The solid writing material creates script which causes color change according to a temperature change, by using a reversible thermochromic composition singly or the same encapsulated in a microcapsule as a colorant to be added into a wax, namely an excipient. In particular, when a microcapsuled pigment encapsulating a thermal color extinction type reversible thermochromic composition is used, the script can be easily decolored by frictional heat, and therefore it can be used as a highly convenient writing instrument allowing easy correction of written information, etc., and can be applied, for example, to writing in a notebook or a memo book, or to drawing. In such a solid writing material, additives such as a resin are considered besides excipients for use for the purpose of enhancing its strength, but depending on the resin, its use is problematic, for example, because it may adversely affect the color changing property of the reversibly thermochromic composition, and examples of such a problem include inadequate color changing and color extinguishing of script and reduced temporal stability of script, which means, for example, that the script changes or develops color again after its color is once changed or extinguished.

CITATION LIST

Patent Literature

[Patent Literature 1] Japanese Unexamined Utility Model Application Publication No. H7-6248
[Patent Literature 2] Japanese Unexamined Patent Application Publication No. 2008-291048
[Patent Literature 3] Japanese Unexamined Patent Application Publication No. 2009-166310

Non-Patent Literature

[Non-Patent Literature 1] "Microcapsule—Production Method, Properties, and Applications", co-written by Kondo Tamotsu, and Koishi Masumi, Sankyo Publishing Co., Ltd., 1977

SUMMARY OF INVENTION

Technical Problem

The present invention is to provide a solid writing material that does not adversely affect the color changing property of script and can obtain adequate strength.

Solution to Problem

The present invention has come to be completed, solving the above-mentioned problems by, for example, using a styrene-structure-containing polymer as the excipient or the resin in a solid writing material that includes: a reversible thermochromic microcapsuled pigment encapsulating a temperature-sensitive color-changeable color-memorizing composition (hereinafter referred to as microcapsuled pigment); an excipient; and a resin; the temperature-sensitive color-changeable color-memorizing composition including at least (a) an electron-donating coloring organic compound, (b) an electron accepting compound and (c) a reaction medium effecting reversibly an electron transfer reaction between the (a) and (b) components in a specific temperature range.

In other words, the present invention relates to:
"1. A solid writing material comprising:
a reversible thermochromic microcapsuled pigment encapsulating a temperature-sensitive color-changeable color-memorizing composition, which comprises at least
(a) an electron-donating coloring organic compound,
(b) an electron accepting compound and
(c) a reaction medium effecting reversibly an electron transfer reaction between (a) component and (b) component in a specific temperature range;
an excipient; and
a resin;
wherein said excipient or said resin comprises a styrene-structure-containing polymer.
2. The solid writing material according to 1, wherein said resin contains a styrene-based resin as said styrene-structure-containing polymer.
3. The solid writing material according to 2, wherein said styrene-based resin is a styrene-acrylic resin.
4. The solid writing material according to any one of 1 to 3, wherein said resin further includes a poly(vinyl alcohol)-based resin.
5. The solid writing material according to any one of 1 to 4, wherein said excipient includes a styrene-modified polyolefin wax as said styrene-structure-containing polymer.
6. The solid writing material according to any one of 1 to 5, wherein said excipient further includes one or more selected from sucrose fatty acid ester, dextrin fatty acid ester, and polyolefin wax."

Advantageous Effects of Invention

According to the present invention, by using a styrene-structure-containing polymer for the solid writing material, writing and color changing or color extinguishing can be achieved without adversely affecting the color changing property of script written on a writing surface using the solid writing material. In addition, superior effects can be achieved because the strength of the solid writing material is enhanced, resulting in enhanced impact resistance during transportation and against dropping, enhanced resistance against breakage due to writing pressure during writing, and so on.

BRIEF DESCRIPTION OF DRAWINGS

FIG. 1 is an explanatory chart illustrating a color changing behavior of script created by a solid writing material according to the present invention.

DESCRIPTION OF EMBODIMENTS

The solid writing material according to the present invention includes: a reversible thermochromic microcapsuled pigment encapsulating a temperature-sensitive color-changeable color-memorizing composition; an excipient;

and a resin; the temperature-sensitive color-changeable color-memorizing composition including at least the (a), (b), and (c) components;

wherein the solid writing material is characterized in that a styrene-based resin is used as the resin.

The solid writing material according to the present invention can present a first coloration state and a second coloration state enantiotropically. Herein, the expression "to present a first coloration state and a second coloration state enantiotropically" means to enantiotropically present two colored states developing a color (1) and a color (2); a colored state and a colorless state; or a colorless state and a colored state. In other words, when a first coloration state changes over to a second coloration state owing to a temperature increase, the above meaning encompasses the following: a change from a color (1) to a color (2); a change from a colored state to a colorless state, which is a change of a thermal color extinguishing type; and a change from a colorless state to a colored state, which is a change of a thermal color-developing type.

Color change behavior of script written with the solid writing material according to the present invention will be described taking a thermal color extinction type as an example referring to FIG. 1. In FIG. 1, the ordinate expresses color density, and the abscissa expresses temperature. The color density change with a temperature change progresses along the arrows. In this regard, A is a point expressing the density at a temperature t4, at which a completely colorless state is produced (hereinafter occasionally referred to as "completely colorless temperature"), B is a point expressing the density at a temperature t3, at which color extinction starts (hereinafter occasionally referred to as "color extinction initiation temperature"), C is a point expressing the density at a temperature t2, at which color development starts (hereinafter occasionally referred to as "coloration initiation temperature"), and D is a point expressing the density at a temperature t1, at which a completely colored state is produced (hereinafter occasionally referred to as "completely colored temperature"). A color changing temperature range is the temperature range between the t1 and t4, in which both the states of colored state and colorless state can coexist, and the temperature range between t2 and t3 is a temperature range, in which a completely colored state and a completely colorless state can be selectively produced. The length of the line segment EF is a measure for representing a degree of a color change, and the length of the line segment HG passing through the midpoint of the line segment EF is a temperature range representing a degree of hysteresis (hereinafter occasionally referred to as "ΔH"). Presence of a ΔH value according to the present invention exhibits hysteresis characteristics, which maintain selectively the first coloration state and the second coloration state in a certain temperature range.

The solid writing material according to the present invention uses a styrene-structure-containing polymer. Here, the styrene-structure-containing polymer is not particularly limited as long as it includes a styrene structure in a polymer structure, and examples of the styrene-structure-containing polymer include polymers containing a recurring unit having a styrene structure, and polymers containing a substituent having a styrene structure.

The solid writing material according to the present invention includes an excipient and a resin. Either or both of them include the above-mentioned styrene-structure-containing polymer.

According to the present invention, when the resin includes a styrene-structure-containing polymer, the polymer is preferably a styrene-based resin.

Examples of the styrene-based resin include polystyrene, styrene-acrylic resin, acrylonitrile-butadiene-styrene resin, styrene-acrylonitrile resin, styrene-butadiene resin, or styrene-ethylene-butadiene-styrene resin. Among them are specifically HYMER ST-95 (polystyrene, made by Sanyo Chemical Industries, Ltd.), HYMER ST120 (polystyrene, made by Sanyo Chemical Industries, Ltd.), HYMER SB305 (styrene-acrylic ester resin, made by Sanyo Chemical Industries, Ltd.), HYMER SBM73F (styrene-acrylic ester resin, made by Sanyo Chemical Industries, Ltd.), or HYMER SB317 (styrene-acrylic ester resin, made by Sanyo Chemical Industries, Ltd.). As a styrene-based resin used for the solid writing material according to the present invention, a styrene-acrylic resin is preferably used. Further, one having a number average molecular weight in a specific range is preferable because it provides a preferable strength of the solid writing material and a preferable abrasion wear during writing. The number average molecular weight is preferably in the range of 2000 to 3000, in particular preferably 4000 to 20000. When the number average molecular weight is smaller than this range, the strength tends to be lower, and when the number average molecular weight is larger than the range, the solid writing material becomes too hard to abrade during writing, having a tendency for a smaller abrasion wear, and consequently having a tendency for reduced color development and writing feel. In particular preferably, the number average molecular weight is in the range of 10000 to 15000, and when it is in this range, all of the strength, color development, and writing feel of the solid writing material are most preferable.

The solid writing material according to the present invention does not adversely affect the color changing property, and has a high strength, presumably owing to the following mechanism: a styrene-based resin is a high polymer compound that basically does not include a polar functional group such as a hydroxyl group or an acid radical, and so it does not easily permeate through the capsule wall of the microcapsuled pigment, preventing such an interaction as adversely affects color changing and color extinguishing from being easily caused to the temperature-sensitive color-changeable color-memorizing composition encapsulated in the microcapsuled pigment. In addition, because of the affinity of the styrene-based resin, the resin acts as a protective membrane on the microcapsuled pigment, and reaction between electron-accepting materials and electron-donating compounds, both used as an excipient, a filler, various additives, etc., is prevented, resulting in no effect on the color changing property. This is presumed to be more notable in particular when the capsule wall of the microcapsuled pigment includes an aromatic series compound. Furthermore, the styrene-based resin is considered to enhance the strength of the solid writing material at the same time, because it increases bonding force by forming a rigid network through, for example, a π-π interaction between aromatic rings derived from the styrene backbone.

The addition content of the styrene-based resin is preferably 0.1 mass-% to 10 mass-%, more preferably 0.5% to 5 mass-%, with respect to the total mass of the solid writing material. When the addition content is lower than this range, the color changing property tends to be inferior, and when the addition content is larger than this range, the writing feel tends to be inferior. More preferably, the addition content is 0.5 mass-% to 2 mass-%, and it is preferable in this range because it can satisfy both the writing feel and the color changing property.

For the solid writing material according to the present invention, a resin other than a styrene-based resin can be used together. Examples of a resin used together include poly(vinyl alcohol), olefin resin, polyamide resin, and poly(vinyl acetate). As a resin used together, poly(vinyl alcohol) is preferably used. As poly(vinyl alcohol), a partially saponified product whose saponification degree is 80 mol % or less is preferable. Among them are specifically GOHSEFIMER LL-02 (saponification degree 45-51 mol %, made by The Nippon Synthetic Chemical Industry Co., Ltd.), GOHSEFIMER L-5407 (saponification degree 30-38 mol %, made by The Nippon Synthetic Chemical Industry Co., Ltd.), or GOHSEFIMER L-7514 (saponification degree 34-41 mol %, made by The Nippon Synthetic Chemical Industry Co., Ltd.). Using poly(vinyl alcohol) together is preferable because it exhibits a tendency for enhanced moldability and strength of the solid writing material.

The addition content of the poly(vinyl alcohol) is preferably 0.5 mass-% to 10 mass-%, more preferably 2% to 5 mass-%, with respect to the total mass of the solid writing material. When the addition content is lower than this range, the moldability and strength tend to be inferior, and when the addition content is larger than this range, the writing feel and color changing property tend to be inferior. The addition ratio of the poly(vinyl alcohol) to the styrene-based resin is preferably 0.2 to 20 parts by mass, in particular preferably 0.4 to 5 parts by mass of the poly(vinyl alcohol) to 1 part by mass of the styrene-based resin. The addition ratio in this range maintains the color changing property well while enhancing the strength and improving the writing feel for the solid writing material.

In one aspect of the present invention, when the above-mentioned excipient includes a styrene-structure-containing polymer, the polymer is preferably a styrene-modified polyolefin wax. Using a styrene-modified polyolefin wax as an excipient is preferable because it has a tendency for enhanced strength of the solid writing material without adversely affecting the color changing property. The same reason as this is presumed to apply to the resin including a styrene-based resin. Meanwhile, using the styrene-modified polyolefin wax tends to increase abrasion wear and to increase the amount of a coloring component of the solid writing material adhering to a paper surface, etc. Specific examples of the styrene-modified polyolefin wax preferably usable in the present invention include the SPW series made by Seiko PMC Corporation.

The solid writing material according to the present invention may include an excipient other than the styrene-structure-containing polymer. Examples of such an excipient include a wax, a gelation agent, and a clay. As a wax, any heretofore known wax may be used, and specific examples thereof include a carnauba wax, a Japan wax, a beeswax, a microcrystalline wax, a montan wax, a candelilla wax, a sucrose fatty acid ester, a dextrin fatty acid ester, a polyolefin wax, or a paraffin wax. As a gelation agent, any heretofore known gelation agent may be used, and examples thereof include 12-hydroxystearic acid, a dibenzylidene sorbitol, a tribenzylidene sorbitol, an amino acid oil, or an alkali metal salt of a higher fatty acid. Examples of a clay mineral include kaolin, bentonite or montmorillonite. It is preferred that the excipient should include at least one of a polyolefin wax, a sucrose fatty acid ester, and a dextrin fatty acid ester. Specific examples thereof include waxes, such as polyethylene, polypropylene, polybutylene, an α-olefin polymer, an ethylene-propylene copolymer, or an ethylene-butene copolymer.

The polyolefin wax with a softening point in a range from 100° C. to 130° C. and a penetration of 10 or less is used especially preferably owing to a favorable writing feel. When the penetration exceeds 10, the solid writing material becomes too soft, and writing tends to become difficult, and, further, in erasing script the same is elongated over a paper surface (a wax is filmed to a thin layer) to stain a blank part on the writing surface or contaminate another paper with color or dirt.

In this regard, the measurement methods for the softening point and penetration of the polyolefin wax are standardized in JISK2207, and a penetration value of 0.1 mm is expressed by "penetration 1." Accordingly, the smaller the number is, the harder the solid writing material is, and the larger the number is, the softer the solid writing material is.

Specific examples thereof include Neowax series (polyethylene, made by Yasuhara Chemical Co., Ltd.), SANWAX series (polyethylene, made by Sanyo Chemical Industries, Ltd.), Hi-WAX series (polyolefin, made by Mitsui Chemicals, Inc.), or A-C Polyethylene (polyethylene, made by Honeywell).

As an excipient for the solid writing material according to the present invention, one containing at least one of a sucrose fatty acid ester and a dextrin fatty acid ester can be preferably used, because the script density can be improved.

When a styrene-modified polyolefin wax, which has a low polarity, and a sucrose fatty acid ester or dextrin fatty acid ester, etc., which has a high polarity, are used together, a microscopic phase separation is thought to arise from the affinity between the mixed waxes. Presumably, the effect of enhanced strength of the styrene-modified polyolefin wax is obtained, and disintegration due to the microscopic phase separation is also imparted, whereby the abrasion wear for the solid writing material tends to increase, resulting in an improved script density.

As the sucrose fatty acid ester, especially an ester with a C12 to C22 fatty acid as a constituent fatty acid is preferable, and a more preferable constituent fatty acid is a palmitic acid or a stearic acid. Specific examples thereof include RYOTO Sugar Ester series made by Mitsubishi-Kagaku Foods Corporation, or Sugar Wax series made by Dai-Ichi Kogyo Seiyaku Co., Ltd.

As a dextrin fatty acid ester used for the solid writing material according to the present invention, especially an ester using a C14 to C18 fatty acid as a constituent fatty acid is favorable, and a more preferable constituent fatty acid is a palmitic acid, a myristic acid, or a stearic acid. Specific examples thereof include Rheopearl series made by Chiba Flour Milling Co., Ltd.

The addition content of the excipient used for the solid writing material according to the present invention is preferably 0.2 to 70 mass-% with respect to the total mass of the solid writing material. When the addition content is below the range, there appears a tendency that a shape as a solid writing material is harder to obtain, and when the addition content is beyond the range, there appears a tendency that an adequate script density is harder to obtain. The addition content is preferably 0.5 to 40 mass-%, and this range can satisfy both the shape and script density of the solid writing material.

As the component (a) encapsulated in the microcapsuled pigment used for the solid writing material according to the present invention, a so-called leuco dye, which is ordinarily used for a heat-sensitive material such as a thermal recording paper, can be used. Specific examples thereof include diphenylmethane phthalides, indolylphthalides, diphenylmethane azaphthalides, phenylindolylazaphthalides, fluorans, styrynoquinolines, or dyes such as diazarhodamine lactones.

More specifically, examples thereof include: 3,3-bis(p-dimethylaminophenyl)-6-dimethylaminophthalide, 3-((4-diethylaminophenyl)-3-(1-ethyl-2-methylindole-3-yl)phthalide, 3,3-bis(1-n-butyl-2-methylindole-3-yl)phthalide, 3,3-bis(2-ethoxy-4-diethylaminophenyl)-4-azaphthalide, 3-[2-ethoxy-4-(N-ethylanilino)phenyl]-3-(1-ethyl-2-methylindole-3-yl)-4-azaphthalide, 3,6-diphenyl aminofluoran, 3,6-dimethoxy fluoran, 3,6-di-n-butoxy fluoran, 2-methyl-6-(N-ethyl-N-p-tolylamino)fluoran, 3-chloro-6-cyclohexylaminofluoran, 2-methyl-6-cyclohexylaminofluoran, 2-((2-chloroanilino)-6-di-n-butylaminofluoran, 2-((3-trifluoromethylanilino)-6-diethylaminofluoran, 2-((N-methylanilino)-6-(N-ethyl-N-p-tolylamino)fluoran, 1,3-dimethyl-6-diethylaminofluoran, 2-chloro-3-methyl-6-diethylaminofluoran, 2-anilino-3-methyl-6-diethylaminofluoran, 2-anilino-3-methyl-6-di-n-butylaminofluoran, 2-xylidino-3-methyl-6-diethylaminofluoran, 1,2-benz-6-diethylaminofluoran, 1,2-benz-6-(N-ethyl-N-isobutylamino)fluoran, 1,2-benz-6-(N-ethyl-N-isoamylamino)fluoran, 2-((3-methoxy-4-dodecoxystyryl)quinoline, spiro[5H-(1)benzopyrano(2,3-d)pyrimidine-5,1'(3'H)isobenzofuran]-3'-one, 2-((diethylamino)-8-(diethylamino)-4-methyl-spiro[5H-(1)benzopyrano(2,3-g)pyrimidine-5,1'(3'H)isobenzofuran]-3-one, 2-((di-n-butylamino)-8-(di-n-butylamino)-4-methyl-Spiro-[5H-(1)benzopyrano(2,3-g)pyrimidine-5,1'(3H)isobenzofuran]-3-one, 2-((di-n-butylamino)-8-(diethylamino)-4-methyl-spiro-[5H-(1)benzopyrano(2,3-g)pyrimidine-5,1'(3H)isobenzofuran]-3-one, 2-((di-n-butylamino)-8-(N-ethyl-N-i-amylamino)-4-methyl-spiro[5H-(1)benzopyrano(2,3-g)pyrimidine-5,1'(3'H)isobenzofuran]-3-one, 3-((2-methoxy-4-dimethylaminopheriyl)-3-(1-butyl-2-methylindole-3-yl)-4,5,5,7-tetrachlorophthalide, 3-((2-ethoxy-4-diethylaminophenyl)-3-(1-ethyl-2-methylindole-3-yl)-4,5,6,7-tetrachlorophthalide, 3-((2-ethoxy-4-diethylaminophenyl)-3-(1-pentyl-2-methylindole-3-yl)-4,5,6,7-tetrachlorophthalide, 3',6'-bis[phenyl(2-methylphenyl)amino]-spiro[isobenzofuran-1(3H),9'-[9H]xanthene]-3-one, 3',6'-bis[phenyl(3-methylphenyl)amino]-spiro[isobenzofuran-1(3H),9'-[9H]xanthene]-3-one, or 3',6'-bis[phenyl(3-ethylphenyl)amino]-spiro[isobenzofuran-1(3H),9'-[9H]xanthene]-3-one.

Further, compounds such as pyridines, quinazolines and bisquinazoline, which are effective in developing fluorescent yellow or red color, can be also employed.

Examples of the electron-accepting compounds of the component (b) included in a microcapsuled pigment used for the solid writing material according to the present invention include compounds having active protons, pseudo-acidic compounds (which are not acids but act as acids to develop the color of the component (a)) and compounds having electron holes. The compounds having active protons include compounds having a phenolic hydroxyl group such as monophenols and polyphenols; those having substituent groups such as alkyls, aryls, acyls, alkoxycarbonyls, carboxyls and esters or amides thereof, and halogens; and phenol-aldehyde condensed resins such as bis- or tris-phenols. Furthermore, it is possible to use metal salts of the above compounds having a phenolic hydroxyl group.

More specifically, examples thereof include: phenol, o-cresol, tertiary butyl catechol, nonylphenol, n-octylphenol, n-dodecylphenol, n-stearyl phenol, p-chlorophenol, p-bromophenol, o-phenylphenol, n-butyl p-hydroxybenzoate, n-octyl p-hydroxybenzoate, resorcin, dodecyl gallate, 2,2-bis(4-hydroxyphenyl)propane, 4,4-dihydroxydiphenyl sulfone, 1,1-bis(4-hydroxyphenyl)ethane, 2,2-bis(4-hydroxy-3-methylphenyl)propane, bis(4-hydroxyphenyl)sulfide, 1-phenyl-1,1-bis(4-hydroxy-phenyl)ethane, 1,1-bis(4-hydroxyphenyl)-3-methylbutane, 1,1-bis(4-hydroxyphenyl)-2-methyl propane, 1,1-bis(4-hydroxyphenyl) n-hexane, 1,1-bis(4-hydroxyphenyl)n-heptane, 1,1-bis(4-hydroxyphenyl) n-octane, 1,1-bis(4-hydroxyphenyl) n-nonane, 1,1-bis(4-hydroxyphenyl)n-decane, 1,1-bis(4-hydroxyphenyl) n-dodecane, 2,2-bis(4-hydroxyphenyl) butane, 2,2-bis(4-hydroxyphenyl)ethyl propionate, 2,2-bis(4-hydroxyphenyl)-4-methylpentane, 2,2-bis(4-hydroxyphenyl)hexafluoropropane, 2,2-bis-(4-hydroxyphenyl) n-heptane, or 2,2-bis(4-hydroxyphenyl) n-nonane.

Although the above compounds having phenolic hydroxyl groups can develop the thermochromic properties most effectively, it is also possible to use compounds selected from the group consisting of aromatic carboxylic acids, aliphatic carboxylic acids having 2 to 5 carbon atoms, metal salts of carboxylic acids, acidic phosphoric esters and metal salts thereof, and 1,2,3-triazole and derivatives thereof.

Further, as an electron accepting compound, a thermal color development type reversible thermochromic composition, such as a specific alkoxyphenolic compound having a C3 to C18 straight chain or branched chain alkyl group (Japanese Unexamined Patent Application Publication No. H11-129623), a specific hydroxybenzoic acid ester (Japanese Unexamined Patent Application Publication No. 2001-105732), and a gallic acid ester (Japanese Unexamined Patent Application Publication No. 2003-253149), can also be applied.

The component (c), which is a reaction medium effecting reversibly an electron transfer reaction in a specific temperature range by the components (a) and (b) encapsulated in a microcapsuled pigment used for the solid writing material according to the present invention, preferably has a crystallinity in the range of 16 to 100 in the solid writing material. Specific examples thereof include alcohols, esters, ketones, and ethers.

Preferably, as the component (c), a carboxylic acid ester compound, which changes its color exhibiting a characteristic of large hysteresis with respect to a color density-temperature curve (difference in a curve plotting a color density change against a temperature change between a case where the temperature is changed from a low temperature to a high temperature side and a case where the temperature is changed from a high temperature side to a low temperature side), which is able to form a reversible thermochromic composition exhibiting a color memory characteristic, and which has a ΔT value (melting point–cloudy point) from 5° C. to less than 50° C., is, for example, a carboxylic acid ester having a substituted aromatic ring in the molecule, an ester of a carboxylic acid having an unsubstituted aromatic ring and a C10 or more aliphatic alcohol, a carboxylic acid ester having a cyclohexyl group in the molecule, an ester of a C6 or more fatty acid and an unsubstituted aromatic alcohol or a phenol, an ester of a C8 or more fatty acid and a branched aliphatic alcohol, an ester of dicarboxylic acid and an aromatic alcohol or a branched aliphatic alcohol, dibenzyl cinnamate, heptyl stearate, didecyl adipate, dilauryl adipate, dimyristyl adipate, dicetyl adipate, distearyl adipated, Trilaurin, Trimyristin, Tristearin, Dimyristin, or Distearin can be used.

Further, a fatty acid ester compound obtained from an aliphatic monohydric alcohol having an odd carbon number of 9 or more and an aliphatic carboxylic acid having an even carbon number, and a fatty acid ester compound having a total carbon number of 17 to 23 obtained from n-pentyl alcohol or n-heptyl alcohol and an aliphatic carboxylic acid having an even carbon number of 10 to 16 may be also used.

Specifically, examples of the esters include: n-pentadecyl acetate, n-tridecyl butyrate, n-pentadecyl butyrate, n-undecyl caproate, n-tridecyl caproate, n-pentadecyl caproate, n-nonyl caprylate, n-undecyl caprylate, n-tridecyl caprylate, n-pentadecyl caprylate, n-heptyl caprate, n-nonyl caprate, n-undecyl caprate, n-tridecyl caprate, n-pentadecyl caprate, n-pentyl laurate, n-heptyl laurate, n-nonyl laurate, n-undecyl laurate, n-tridecyl laurate, n-pentadecyl laurate, n-pentyl myristate, n-heptyl myristate, n-nonyl myristate, n-undecyl myristate, n-tridecyl myristate, n-pentadecyl myristate, n-pentyl palmitate, n-heptyl palmitate, n-nonyl palmitate, n-undecyl palmitate, n-tridecyl palmitate, n-pentadecyl palmitate, n-nonyl stearate, n-undecyl stearate, n-tridecyl stearate, n-pentadecyl stearate, n-nonyl eicosanoate, n-undecyl eicosanoate, n-tridecyl eicosanoate, n-pentadecyl eicosanoate, n-nonyl behenate, n-undecyl behenate, n-tridecyl behenate, or n-pentadecyl behenate.

As the ketones, aliphatic ketones having 10 or more carbon atoms in total are effectively employed. Examples thereof include: 2-decanone, 3-decanone, 4-decanone, 2-undecanone, 3-undecanone, 4-undecanone, 5-undecanone, 2-dodecanone, 3-dodecanone, 4-dodecanone, 5-dodecanone, 2-tridecanone, 3-tridecanone, 2-tetradecanone, 2-pentadecanone, 8-pentadecanone, 2-hexadecanone, 3-hexadecanone, 9-heptadecanone, 2-pentadecanone, 2-octadecanone, 2-nonadecanone, 10-nonadecanone, 2-eicosanone, 11-eicosanone, 2-heneicosanone, 2-docosanone, laurone or stearone.

Further, examples of arylalkyl ketones having 12 to 24 carbon atoms include: n-octadecanophenone, n-heptadecanophenone, n-hexadecanophenone, n-pentadecanophenone, n-tetradecanophenone, 4-n-dodecaacetophenone, n-tridecanophenone, 4-n-undecanoacetophenone, n-laurophenone, 4-n-decanoacetophenone, n-undecanophenone, 4-n-nonylacetophenone, n-decanophenone, 4-n-octylacetophenone, n-nonanophenone, 4-n-heptylacetophenone, n-octanophenone, 4-n-hexylacetophenone, 4-n-cyclohexylacetophenone, 4-tert-butylpropiophenone, n-heptaphenone, 4-n-pentylacetophenone, cyclohexyl phenyl ketone, benzyl-n-butyl ketone, 4-n-butylacetophenone, n-hexanophenone, 4-isobutylacetophenone, 1-acetonaphthone, 2-acetonaphthone, or cyclopentyl phenyl ketone.

As the ethers, aliphatic ethers having 10 or more carbon atoms in total are effectively employed. Examples thereof include: dipentyl ether, dihexyl ether, diheptyl ether, dioctyl ether, dinonyl ether, didecyl ether, diundecyl ether, didodecyl ether, ditridecyl ether, ditetradecyl ether, dipentadecyl ether, dihexadecyl ether, dioctadecyl ether, decanediol dimethyl ether, undecanediol dimethyl ether, dodecanediol dimethyl ether, tridecanediol dimethyl ether, decanediol diethyl ether, or undecanediol diethyl ether.

Further, as the component (c), preferably used is a compound represented by the following general formula (1):

[Chem. 1]

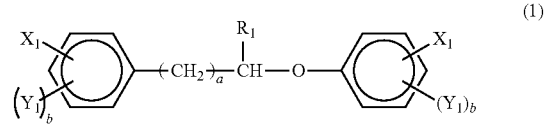

(wherein $R_1$ is hydrogen or methyl; a is an integer of 0 to 2; one $X_1$ is $-(CH_2)_nOCOR'$ or $-(CH_2)_nCOOR'$, and the other is hydrogen; b is an integer of 0 to 2; R' is an alkyl or alkenyl group having 4 or more carbon atoms; each $Y_1$ is independently hydrogen, an alkyl group of 1 to 4 carbon atoms, a methoxy group or a halogen; and each b is independently an integer of 1 to 3)

The compound represented by the above formula (1) in which $R_1$ is hydrogen is preferred because it provides a reversibly thermochromic composition having a larger hysteresis width, and more preferably $R_1$ and a are hydrogen and 0, respectively.

Among the compounds represented by the formula (1), further preferably used is a compound represented by the following general formula (2):

[Chem. 2]

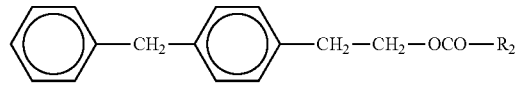

(wherein $R_2$ is an alkyl or alkenyl group having 8 or more carbon atoms, preferably an alkyl group having 10 to 24 carbon atoms, and more preferably an alkyl group having 12 to 22 carbon atoms).

Specific examples of the above compound include: 4-benzyloxyphenylethyl octanoate, 4-benzyloxyphenylethyl nonanoate, 4-benzyloxyphenylethyl decanoate, 4-benzyloxyphenylethyl undecanoate, 4-benzyloxyphenylethyl dodecanoate, 4-benzyloxyphenylethyl tridecanoate, 4-benzyloxyphenylethyl tetradecanoate, 4-benzyloxyphenylethyl pentadecanoate, 4-benzyloxyphenylethyl hexadeca nate, 4-benzyloxyphenylethyl heptadecanoate, or 4-benzyloxyphenylethyl octadecanoate.

In addition, as the component (c), it is also possible to use a compound represented by the following general formula (3):

[Chem. 3]

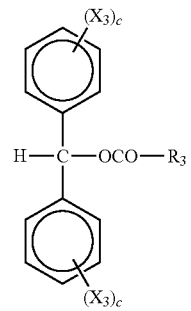

(wherein $R_3$ is an alkyl or alkenyl group having 8 or more carbon atoms; each c is independently an integer of 1 to 3; and each $X_3$ is independently hydrogen, an alkyl group having 1 to 4 carbon atoms, an alkoxy group having 1 to 4 carbon atoms, or a halogen).

Specific examples of the above compound include: 1,1-diphenylmethyl octanoate, 1,1-diphenylmethyl nonanoate, 1,1-diphenylmethyl decanoate, 1,1-diphenylmethyl undecanoate, 1,1-diphenylmethyl dodecanoate, 1,1-diphenylmethyl tridecanoate, 1,1-diphenylmethyl tetradecanoate, 1,1-diphenylmethyl pentadecanoate, 1,1-diphenylmethyl hexadecanoate, 1,1-diphenylmethyl heptadecanoate, or 1,1-diphenylmethyl octadecanoate.

Furthermore, as the component (c), it is still also possible to use a compound represented by the following general formula (4):

[Chem. 4]

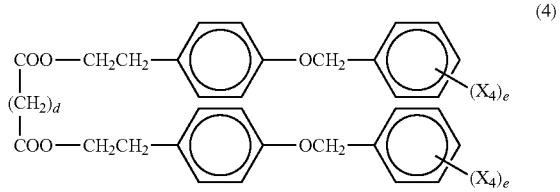

(4)

(wherein each $X_4$ is independently hydrogen, an alkyl group having 1 to 4 carbon atoms, a methoxy group, or a halogen; each e is independently an integer of 1 to 3; and d is an integer of 1 to 20).

Examples of the above compound include: diester of malonic acid with 2-[4-(4-chlorobenzyloxy)phenyl]ethanol, diester of succinic acid with 2-(benzyloxyphenyl)ethanol, diester of succinic acid with 2-[4-(3-methylbenzyloxy)phenyl]ethanol, diester of glutaric acid with 2-(4-benzyloxyphenyl)ethanol, diester of glutaric acid with 2-[4-(4-chlorobenzyloxy)phenyl]ethanol, diester of adipic acid with 2-(4-benzyloxyphenyl)ethanol, diester of pimelic acid with 2-(4-benzyloxyphenyl)ethanol, diester of suberic acid with 2-(4-benzyloxyphenyl)ethanol, diester of suberic acid with 2-[4-(3-methylbenzyloxy)phenyl]ethanol, diester of suberic acid with 2-[4-(4-chlorobenzyloxy)phenyl]ethanol, diester of suberic acid with 2-[4-(2,4-dichlorobenzyloxy)phenyl]ethanol, diester of azelaic acid with 2-(4-benzyloxyphenyl)ethanol, diester of sebacic acid with 2-(4-benzyloxyphenyl)ethanol, diester of 1,10-decanedicarboxylic acid with 2-(4-benzyloxyphenyl)ethanol, diester of 1,18-octadecanedicarboxylic acid with 2-(4-benzyloxyphenyl)ethanol, or diester of 1,18-octadecane-dicarboxylic acid with 2-[4-(2-methyl benzyloxy)phenyl]ethanol.

Still further, as the component (c), it is yet also possible to use a compound represented by the following general formula (5):

[Chem. 5]

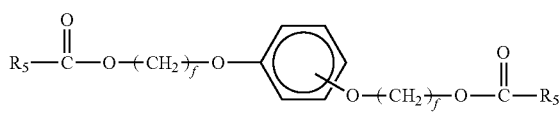

(5)

(wherein $R_5$ is an alkyl or alkenyl group having 1 to 21 carbon atoms; and each f is independently an integer of 1 to 3).

Examples of the above compound include: diester of capric acid with 1,3-bis(2-hydroxyethoxy)benzene, diester of undecanoic acid with 1,3-bis(2-hydroxyethoxy)benzene, diester of lauric acid with 1,3-bis(2-hydroxyethoxy)benzene, diester of myristic acid with 1,3-bis(2-hydroxyethoxy)benzene, diester of butyric acid with 1,4-bis(hydroxymethoxy)benzene, diester of isovaleric acid with 1,4-bis(hydroxymethoxy)benzene, diester of acetic acid with 1,4-bis(2-hydroxyethoxy)benzene, diester of propionic acid with 1,4-bis(2-hydroxyethoxy)benzene, diester of valeric acid with 1,4-bis(2-hydroxyethoxy)benzene, diester of caproic acid with 1,4-bis(2-hydroxyethoxy)benzene, diester of carpylic acid with 1,4-bis(2-hydroxyethoxy)benzene, diester of capric acid with 1,4-bis(2-hydroxyethoxy)benzene, diester of lauric acid with 1,4-bis(2-hydroxyethoxy)benzene, or diester of myristic acid with 1,4-bis(2-hydroxyethoxy)benzene.

Yet further, as the component (c), it is furthermore possible to use a compound represented by the following general formula (6):

[Chem. 6]

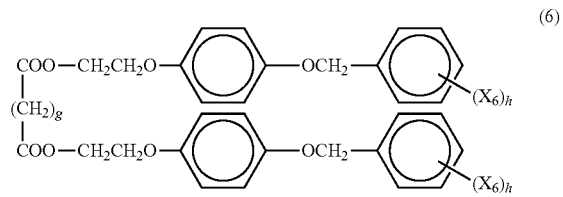

(6)

(wherein each $X_6$ is independently hydrogen, an alkyl group having 1 to 4 carbon atoms, an alkoxy group having 1 to 4 carbon atoms, or a halogen; h is an integer of 1 to 3; and g is an integer of 1 to 20).

Examples of the above compound include: diester of succinic acid with 2-phenoxyethanol, diester of suberic acid with 2-phenoxyethanol, diester of sebacic acid with 2-phenoxyethanol, diester of 1,10-decanedicarboxylic acid with 2-phenoxyethanol, or diester of 1,18-octadecanedicarboxylic acid with 2-phenoxyethanol.

Although the blend ratio of three components of (a), (b) and (c) encapsulated in a microcapsulated pigment used for the solid writing material according to the present invention is decided according to the density, the color change temperature, the color change form, and the type of each component, a blend ratio for obtaining desired characteristics is generally, in a mass ratio, component (a):component (b):component (c)=1:0.1 to 50:1 to 800 by mass, and more preferably, component (a):component (b):component (c)=1: 0.5 to 20:5 to 200. With respect to each component, two or more kinds may be mixed for use.

A microcapsuled pigment used for the solid writing material according to the present invention may contain, to the extent that the function is not affected, various additives, such as an antioxidant, a UV absorber, an infrared light absorption agent, a solubilizing agent, an antifungal and antibacterial agent. The solid writing material according to the present invention can be accomplished by adding a non-thermochromic colorant, such as a dyestuff and a pigment, when the first coloration state and the second coloration state exert a change between color (1) and color (2).

For a microcapsuled pigment used according to the present invention, the mass ratio of an internal material to a capsule wall is preferably internal material:capsule wall=1:1 to 7:1. When the ratio of an internal material is above the range, a capsule wall becomes thin in terms of the thickness and vulnerable to pressure and heat, so that a microcapsule tends to be broken, and when it is below the range the density or visibility in a colored state tends to decrease. More preferable is internal material:capsule wall=1:1 to 6:1, and within the range, the density and visibility in a colored state can be high and a microcapsule is not broken.

Although there is no particular restriction on the size of a microcapsuled pigment to be used for the solid writing material according to the present invention, the average particle size is preferably from 0.1 to 50 µm. When the same is below the range, the developed color density tends to decrease, and when the same is beyond the range, the dispersion stability or processability in using the same for the solid writing material tends to decrease. The average particle size is more preferably from 0.3 to 30 µm. Within the range, the colored state is good and the dispersion stability and processability are improved.

The average particle size of a microcapsuled pigment is expressed herein by a volume-based D50 value in a measurement of the outside diameter of a particle, and here, a measurement is carried out with a Laser Diffraction/Scattering Particle Size Distribution Analyzer (LA-300, made by Horiba, Ltd.), so that a value of an average particle size (median diameter) calculated based on the measured values is used.

The addition content of a microcapsuled pigment used for the solid writing material according to the present invention is preferably from 1 to 70 mass-% with reference to the total mass of the solid writing material. When the content is below the range, the developed color density tends to become low, and when it is beyond the range, the strength of the solid writing material tends to decrease. The content is preferably from 5 to 50 mass-%, further preferably from 10 to 40 mass-%, and within the range, both the strength of the solid writing material and the script density can be satisfied.

As a production method for the microcapsuled pigment, a generally known method as described, for example, in Non-Patent Literature 1 ("Microcapsule—Production Method, Properties, and Applications", co-written by Kondo Tamotsu, and Koishi Masumi, Sankyo Publishing Co., Ltd., 1977), can be applied. Specific examples thereof include a coacervation method, an interfacial polymerization method, an interfacial polycondensation method, anin-situpolymerization method, an in-liquid drying method, an in-liquid curing method, a suspension polymerization method, an emulsion polymerization process, an air suspension coating method, and a spray drying method, and an appropriate one may be selected.

To the solid writing material according to the present invention, various additives may be added, as desired. Examples of an additive include a filler, a viscosity adjuster, an antifungal agent, an antiseptic agent, an antibacterial agent, an ultraviolet light prevention agent, a light stabilizing material, and a perfume. Examples of the filler include talc, clay, silica, calcium carbonate, barium sulfate, alumina, mica, boron nitride, potassium titanate, and a glass flake, and talc or calcium carbonate is preferable from a viewpoint of moldability in particular. The filler is added in order to improve the strength of the solid writing material according to the present invention, and to adjust the writing feel thereof.

The solid writing material according to the present invention can be accomplished by adding a non-thermochromic colorant, such as a dyestuff and a pigment, when the first coloration state and the second coloration state exert a change between color (1) and color (2).

The solid writing material according to the present invention can write on various writing surfaces. Further, it is possible to change the color of the script by rubbing it by finger or applying a heating device or a cooling device.

Examples of the heating device include an electric heating color changing device equipped with a resistance heating element, a heating color changing device filled with hot water, and a hair blower, and a friction member is preferably used as a means for changing color by a simple method.

As the friction member, an elastic body of an elastomer, a plastic foam, etc. that can generate frictional heat by appropriate friction caused by rubbing is used preferably. Examples of a material for the friction member to be used include a silicone resin, an SEBS resin (styrene-ethylene-butadiene-styrene block copolymer), and a polyester resin. The friction member can serve for a solid writing material set, which is a combination of a solid writing material and a friction body that is a desirably shaped object different from the solid writing material, and the solid writing material set will also be highly portable with an external packaging container containing a solid writing tool and having a friction member on the solid writing tool or on the external packaging. Specifically, for example, this may be in the form in which a friction member is provided on a wooden or paper external packaging shaped like a pencil, a crayon, etc.

Examples of the cooling device include a cooling color changing device utilizing a Peltier device, a cooling color changing device filled with a coolant, such as cold water and ice chips, and application of an ice pack, a refrigerator, or a freezer.

EXAMPLES (Production of Microcapsuled Pigment A)

A temperature-sensitive color-changeable color-memorizing composition composed of: as the component (a): 1.0 part of 2-(dibutylamino)-8-(dipentylamino)-4-methyl-spiro[5H-[1]benzopyrano[2,3-g]pyrimidine-5,1'(3'H)-isobenzofuran]-3-one, as the component (b): 3.0 parts of 4,4'-(2-ethylhexane-1,1-diyl)diphenol, and 5.0 parts of 2,2-bis(4'-hydroxyphenyl)-hexafluoropropane, and as the component (c): 50.0 parts by mass of 4-benzyloxyphenylethyl caprate was heated to dissolve, to which 30.0 parts by mass of an aromatic isocyanate prepolymer as a capsule wall material and 40.0 parts by mass of a co-solvent were added. The product solution was emulsified in an 8% poly(vinyl alcohol) aqueous solution and stirred with heating, followed by addition of 2.5 parts by mass of a water-soluble modified aliphatic amine and additional stirring to obtain finally a thermochromic microcapsule suspension. The suspension was centrifuged to isolate a thermochromic microcapsule. The microcapsule had an average particle size of 2.3 µm, exhibited hysteresis characteristics of $t_1$: −20° C., $t_2$: −10° C., $t_3$: 48° C., $t_4$: 58° C., ΔH: 68° C., temperature-sensitive color-changeable color-memorizing composition:capsule wall=2.6:1.0, and changed its color reversibly from pink to colorless, and from colorless to pink.

(Production of Microcapsuled Pigment B)

A temperature-sensitive color-changeable color-memorizing composition composed of: as the component (a): 1.5 parts of 1,2-benz-6-diethylaminofluoran, as the component (b): 5.0 parts of 2,2-bis(4'-hydroxyphenyl)-4-methylpentane, and as the component (c): 50.0 parts by mass of tridecyl caprate was heated to dissolve, and mixed with a mixed solution of 10 parts of Epon 828 (epoxy resin, made by Yuka Shell Epoxy Co., Ltd.) and 10 parts of methyl ethyl ketone, and the mixture was added dropwise to 100 parts of a 10% gelatin aqueous solution and stirred to form microdroplets. To this solution during the stirring was added gradually a solution in which separately prepared 5 parts of a curing agent U (amine-added epoxy resin, made by Yuka Shell Epoxy Co., Ltd.) was dissolved in 45 parts of water, and the product solution was stirred at a maintained solution temperature of 80° C. for about 5 hours to yield a thermochromic microcapsule suspension. The suspension was centrifuged to isolate a thermochromic microcapsule. The The above composition was kneaded with a kneader, and the resulting kneaded material was subjected to compression molding with a press to obtain a solid writing material having an outer diameter of 3 mm and a length of 60 mm.

Examples 102 to 113, Comparative Examples 101 to 104

Solid writing materials were yielded by the same method as in Example 101 according to the compositions shown in Table 1.

[Table 1]

TABLE 1

|  |  | Examples |  |  |  |  |  |  |  |  |  |  |  |  | Comparative Examples |  |  |  |
|---|---|---|---|---|---|---|---|---|---|---|---|---|---|---|---|---|---|---|
|  |  | 101 | 102 | 103 | 104 | 105 | 106 | 107 | 108 | 109 | 110 | 111 | 112 | 113 | 101 | 102 | 103 | 104 |
|  | Microcapsuled Pigment A | 38 | 38 | 38 | 38 | 38 | 38 | 38 | 38 | 38 | 38 | 38 | 38 | 38 | 38 | 38 | 38 | 40 |
| Filler | Talc | 35 | 36 | 37 | 38 | 39 | 40 | 40 | 39 | 30 | 40 | 37 | 40 | 38 | 30 | 30 | 40 | 38 |
| Excipient | Sucrose fatty acid ester | 10 | 10 | 10 | 10 | 10 | 10 | 10 | 10 | 10 | 10 | 10 | 10 | 10 | 10 | 15 | 10 | 11 |
|  | Polyethylene wax | 10 | 10 | 10 | 10 | 10 | 10 | 10 | 10 | 10 | 10 | 10 | 10 | 10 | 20 | 15 | 10 | 11 |
| Resin | Styrene resin |  |  |  |  |  |  |  |  |  |  |  | 2 |  |  |  |  |  |
|  | Styrene-acrylic ester resin A | 5 | 4 | 3 | 2 | 1 | 0.5 | 0.1 | 2 | 10 | 2 | 5 |  |  |  |  |  |  |
|  | Styrene-acrylic ester resin B |  |  |  |  |  |  |  |  |  |  |  |  | 2 |  |  |  |  |
|  | Cycloolefin resin |  |  |  |  |  |  |  |  |  |  |  |  |  |  |  | 2 |  |
|  | Poly(vinyl alcohol) | 2 | 2 | 2 | 2 | 2 | 2 | 2 | 1 | 2 |  |  |  | 2 | 2 | 2 | 2 |  |
| Color changing property |  | A | A | A | A | B | B | C | A | A | A | A | B | A | D | D | D | A |
| Moldability |  | A | A | A | A | A | A | A | B | A | C | C | C | A | A | A | B | C |
| Bending strength (Mpa) |  | 18 | 16 | 16 | 18 | 16 | 16 | 17 | 12 | 20 | 10 | 10 | 10 | 21 | 14 | 13 | 11 | 8 |
| Writing feel |  | B | A | A | A | A | A | A | A | B | A | B | A | A | A | B | B | B |
| Evaluation |  | A | A | A | A | A | A | B | B | B | C | C | C | A | D | D | D | D | microcapsule had an average particle size of 2.6 μm, exhibited hysteresis characteristics of t1: 8° C., t2: 13° C., t3: 23° C., t4: 28° C., and 1.3, ΔH: 15° C., and changed its color reversibly from pink to colorless, and from colorless to pink.

Example 101

| (Production of Solid writing material) |  |
|---|---|
| Microcapsuled pigment | 38 parts by mass |
| Styrene-acrylic ester resin A | 5 parts by mass |
| (SB305, number average molecular weight 4000, made by Sanyo Chemical Industries, Ltd.) |  |
| Poly(vinyl alcohol) | 2 parts by mass |
| Polyolefin wax | 10 parts by mass |
| (SANWAX 131-P, softening point 110° C., penetration 3.5, made by Sanyo Chemical Industries, Ltd.) |  |
| Sucrose fatty acid ester | 10 parts by mass |
| (RYOTO Sugar Ester P-170, made by Mitsubishi-Kagaku Foods Corporation) |  |
| Talc (filler) | 38 parts by mass |

The materials used, shown in the Table, are as follows:
Styrene resin: HYMER ST-95 polystyrene, number average molecular weight 4000, made by Sanyo Chemical Industries, Ltd.
Styrene-acrylic ester resin A: HYMER SB305, styrene-acrylic ester, number average molecular weight 4000, made by Sanyo Chemical Industries, Ltd.
Styrene-acrylic ester resin B: HYMER SBM73F, styrene-acrylic ester, number average molecular weight 12000, made by Sanyo Chemical Industries, Ltd.
Cycloolefin resin: TOPAS9007, made by Polyplastics Co., Ltd.
Poly(vinyl alcohol): GOHSEFIMER L-5407, made by Nippon Synthetic Chemical Industry Co., Ltd.

The solid writing materials produced in Examples 101 to 113 and Comparative Examples 101 to 104 were evaluated in terms of color changing property, moldability, bending strength and writing feel thereof according to the following method. The results are shown in Table 1.

Color changing property: A script written with the solid writing material was decolored with a friction erasing tool to create an erasure mark. The obtained erasure mark was left at 5° C. for 24 h and then visually rated.
A: Re-coloration of the erasure mark was not seen and good color changing property was obtained.
B: Re-coloration of the erasure mark was barely seen and good color changing property was retained.

C: Re-coloration of a part of the erasure mark occurred and the deterioration of color changing property was seen, but there was no problem at a practical level.
D: Re-coloration of the erasure mark was confirmed and the erasure performance was deteriorated.
Measurement of bending strength: Bending strength was measured according to JIS-S6005.
Moldability: The appearance of a solid writing material was visually rated. Additionally, the variance of the core diameter of the solid writing material in a longitudinal direction was measured with a micrometer for rating the dimensional precision.
A: The molded solid writing materials have almost no variation in dimensions and are very good as a solid writing material.
B: The molded solid writing materials have a small variation in dimensions and are good as a solid writing material.
C: The molded solid writing materials have a large variation in dimensions but are moldable and practically usable. The script is visible but its density is quite low.
D: Solid writing materials are not moldable.
Writing feel: A script was written with a solid writing material on a piece of acid-free paper, and the writing feel was evaluated.

A: Smooth and thick script is obtainable.

B: The feeling of writing is slightly heavy, but good script is obtainable.

C: The feeling of writing is a little heavy, but writing is possible.

D: Writing is impossible.

As obvious from the results shown in Table 1, the solid writing materials of the present invention were superior in color changing property to those of Comparative Examples. Further, their bending strength was sufficient, and all the performance items including moldability and writing feel were satisfied at the same time, so that they were superior as a solid writing material. In contrast, the solid writing materials shown in Comparative Examples 101 to 104 were inferior in color changing property to the solid writing materials according to the present invention. As described above, the solid writing materials of Comparative Examples did not satisfy all of the script color changing property, moldability, bending strength, and writing feel at the same time, and were inferior to those of the present invention.

Example 201

| (Production of Solid writing material) | |
|---|---|
| Microcapsuled Pigment A | 40 parts by mass |
| Styrene-modified polyolefin wax (SPW-7176, made by Seiko PMC Corporation) | 20 parts by mass |
| Poly(vinyl alcohol) | 2 parts by mass |
| Hindered amine (TINUVIN765, made by BASF SE) | 1 part by mass |
| Talc (filler) | 37 parts by mass |

The above composition was kneaded with a kneader, and the resulting kneaded material was subjected to compression molding with a press to obtain a solid writing material having an outer diameter of 3 mm and a length of 60 mm.

Examples 202 to 207, Comparative Examples 201 to 204

Solid writing materials were yielded by the same method as in Example 201 according to the compositions shown in Table 2.
[Table 2]

TABLE 2

| | | Examples | | | | | | | Comparative Examples | | | |
|---|---|---|---|---|---|---|---|---|---|---|---|---|
| | | 201 | 202 | 203 | 204 | 205 | 206 | 207 | 201 | 202 | 203 | 204 |
| Pigment | Microcapsuled Pigment A | 40 | 40 | 40 | 40 | | | | 40 | 40 | | 40 |
| | Microcapsuled Pigment B | | | | | 30 | 30 | 30 | | | 30 | |
| Excipient | Styrene-modified polyethylene wax | 20 | 10 | 5 | 3 | 10 | 5 | 3 | | | | |
| | Polyethylene wax | | 10 | 10 | 10 | 10 | 10 | 10 | 20 | 10 | 10 | 10 |
| | Sucrose fatty acid ester | | | 5 | 7 | | 5 | 7 | | 10 | 10 | |
| | Oleic amide | | | | | | | | | | | 10 |
| Additive | Hindered amine | 1 | 1 | 1 | 1 | 1 | 1 | 1 | 1 | 1 | 1 | 1 |
| Resin | Poly(vinyl alcohol) | 2 | 2 | 2 | 2 | 2 | 2 | 2 | 2 | 2 | 2 | 2 |
| Filler | Talc | 37 | 37 | 37 | 37 | 47 | 47 | 47 | 37 | 37 | 47 | 37 |
| Bending strength (Mpa) | | 20 | 19 | 18 | 18 | 20 | 19 | 19 | 17 | 17 | 18 | 14 |
| Color changing property | | A | A | B | B | A | B | B | C | C | C | C |
| Abrasion wear (mg/m) | | 0.70 | 0.73 | 0.85 | 0.88 | 0.74 | 0.84 | 0.84 | 0.60 | 0.73 | 0.74 | 0.85 |
| Developed color density | | B | B | A | A | B | A | A | C | B | B | A |
| Evaluation | | A | A | A | A | A | A | A | B | B | B | C |

The solid writing materials produced in Examples 201 to 207 and Comparative Examples 201 to 204 were evaluated in terms of bending strength, color changing property, abrasion wear, and script density thereof according to the following method. The results are shown in Table 2.
Evaluation of bending strength and color changing property: Measurements were made by the same method as in Example 101.
Abrasion wear: Measurements were made of the abrasion wear (the amount of the solid writing material adhering to acid-free paper) obtained when script was written on acid-free paper by an line writing machine using the solid writing material under a 100 g load.
Script density: Script was written on acid-free paper using the solid writing material, and the script density was visually evaluated at the same time.
A: Script is visible and the density is sufficiently high. B: Script is visible and the density is high.
C: Script is visible but the density is quite low.
D: Script is not visible.
As obvious from the results shown in Table 2, the solid writing materials according to the present invention had a larger value for their bending strength than the solid writing materials in Comparative Examples. In addition, they did not have a problem with the color changing property, had an enhanced script density, and were superior as a solid writing material. In contrast, the solid writing materials shown in Comparative Examples 201 to 203 were inferior in bending strength, color changing property, and developed color density to the solid writing materials of the present invention. In addition, the solid writing material in Comparative Example 204 had a higher developed color density but had a problem with the color changing property, and its bending strength value was small. As described above, the solid writing materials in Comparative Examples were inferior to the solid writing materials according to the present invention.

It is obvious from the above-mentioned evaluation results that the solid writing material according to the present invention is superior as a solid writing material in terms of functions including strength, color changing property, moldability, writing feel, abrasion wear, and developed color density, compared to a conventional one.

(Production of Pencil)

A solid writing material produced in Examples 101 to 113 or 201 to 207 was stowed and molded in a round wood casing to obtain a pencil. Each pencil was able to create a script on a piece of acid-free paper. The script was also rubbed by use of a friction body composed of an SEBS resin to be decolored (color extinction).

Application Example A (Production of Solid Writing Tool)

A solid writing material produced in Examples 101 to 113 or 201 to 207 was set in a delivery-typed cylindrical plastic container to obtain a solid writing tool. A friction body composed of an SEBS resin was provided on the posterior end part of the container. The solid writing tool was able to create a clear script on a piece of paper as well as shades by additional drawing. Moreover, by use of the friction body provided on the posterior end part of the container, the script was rubbed to be decolored without producing any remaining color. Because the solid writing tool was provided with a friction body, it was superior in portability.

Application Example B (Production of Solid Writing Tool Set)

The above pencil using a solid writing material produced in Examples 101 to 113 or 201 to 207 was combined with a friction body composed of an SEBS resin to obtain a solid writing tool set. The solid writing material in the solid writing tool set was able to create a clear script on a piece of paper as well as shades by additional drawing. Moreover, by use of the accompanying friction body, the script was rubbed to be decolored without producing any remaining color. Since the solid writing tool set was a set of a writing tool and a friction body, it was more convenient, allowing for easy writing and erasure.

INDUSTRIAL APPLICABILITY

The solid writing material of the present invention can be applied to various writing tools such as a felt pen, a pencil, a colored pencil and the like as well as a drawing material for picture coloring, picture drawing, etc. and a heat sensitive material such as a temperature indicator and the like.

REFERENCE SIGNS LIST $t_1$: Completely colored temperature of script by thermal color extinction type solid writing material of the present invention $t_2$: Coloration initiation temperature of script by thermal color extinction type solid writing material of the present invention $t_3$: Color Extinction initiation temperature of script by thermal color extinction type solid writing material of the present invention $t_4$: Completely colorless temperature of script by thermal color extinction type solid writing material of the present invention $\Delta H$: Temperature range showing a degree of hysteresis

The invention claimed is:

1. A solid writing material comprising:
 a reversible thermochromic microcapsuled pigment encapsulating a temperature-sensitive color-changeable color-memorizing composition, which comprises at least
 (a) an electron-donating coloring organic compound,
 (b) an electron accepting compound and
 (c) a reaction medium effecting reversibly an electron transfer reaction between (a) the electron-donating coloring organic compound and (b) the electron accepting compound in a specific temperature range;
 an excipient comprising a styrene-modified polyolefin wax as a styrene-structure-containing polymer; and
 a resin.

2. The solid writing material according to claim 1, wherein the resin comprises a poly(vinyl alcohol).

3. The solid writing material according to claim 1, wherein the excipient further comprises at least one excipient selected from the group consisting of a sucrose fatty acid ester, a dextrin fatty acid ester, and a polyolefin wax other than the styrene-modified polyolefin wax.

4. A solid writing material comprising:
 a reversible thermochromic microcapsuled pigment encapsulating a temperature-sensitive color-changeable color-memorizing composition, which comprises at least
 (a) an electron-donating coloring organic compound,
 (b) an electron accepting compound and
 (c) a reaction medium effecting reversibly an electron transfer reaction between (a) the electron-donating coloring organic compound and (b) the electron accepting compound in a specific temperature range;
 an excipient; and
 a resin comprising a styrene-acrylic resin as a styrene-structure-containing polymer, wherein the number average molecular weight of the styrene-acrylic resin is in the range of 2000 to 3000.

5. The solid writing material according to claim 4, wherein the resin further comprises a poly(vinyl alcohol).

6. The solid writing material according to claim 4, wherein the excipient comprises at least one excipient selected from the group consisting of a sucrose fatty acid ester, a dextrin fatty acid ester, and a polyolefin wax.

* * * * *